United States Patent [19]

Bronson et al.

[11] 4,155,537
[45] May 22, 1979

[54] ADJUSTABLE LENGTH STRAP TIE DOWN APPARATUS

[76] Inventors: Robert E. Bronson, 710 Holly, Denver, Colo. 80220; Walter J. Ruehle, 14000 E. Progress Way, Denver, Colo. 80232

[21] Appl. No.: 823,717

[22] Filed: Aug. 11, 1977

[51] Int. Cl.² .................... B65D 67/02; B60P 7/10
[52] U.S. Cl. .................... 254/164; 24/71.2; 280/179 A; 105/477
[58] Field of Search .............. 254/164, 163, 161, 51, 254/52, 55, 56; 105/466, 469, 473, 477; 280/179 R, 179 A; 248/361 A; 24/68 R, 68 CD, 68 D, 68 BT, 71.2

[56] References Cited

U.S. PATENT DOCUMENTS

| | | | |
|---|---|---|---|
| 810,795 | 1/1906 | McPherson | 254/161 |
| 3,428,331 | 2/1969 | Morgan et al. | 280/179 A X |
| 3,826,473 | 7/1974 | Huber | 254/164 |
| 3,848,889 | 11/1974 | Sharrow | 280/179 A |
| 3,910,558 | 10/1975 | Brucker et al. | 254/164 |

Primary Examiner—Albert J. Makay
Attorney, Agent, or Firm—Bruce G. Klaas; Dennis K. Shelton

[57] ABSTRACT

Apparatus for holding a first object or objects in a fixed position relative to a second object comprising an elongated continuous length strap means for engaging and holding the first object, strap attachment means connected to opposite ends of the strap means for attaching the strap means to the second object, and winch-type strap tightening means operatively associated with an intermediate loop portion of the strap means for adjustably tensioning the strap means, the winch-type strap tightening means comprising a rotatable shaft means for winding and unwinding the strap means to adjstably tension the strap means, slot means in the shaft means for receiving an intermediate, variable length loop portion of the strap means to enable adjustment of the effective length of strap means, and ratchet means associated with the shaft means for releaseably holding the shaft means against unwinding rotation during and after tensioning of the strap means.

7 Claims, 7 Drawing Figures

ADJUSTABLE LENGTH STRAP TIE DOWN APPARATUS

BACKGROUND AND SUMMARY OF THE INVENTION

This invention relates generally to tie down apparatus for securing first objects to second objects and, more particularly, to adjustable length strap tie down apparatus for securing various types of loads and objects, on various types of vehicles and trailers. While the apparatus of the present invention has unlimited applications and uses, the apparatus is particularly useful for securing objects and loads, such as boats, motorcycles, snowmobiles, luggage, lumber, furniture and the like, on trailers, the roofs or roof top carriers of automobiles, pickup trucks and other truck beds, and the like.

In the past, various devices and apparatus have been used for such purposes. Such prior art devices and apparatus have included such simple devices as ropes or cords or straps and more complicated apparatus including various winch and ratchet mechanisms.

The present invention solves various problems associated with prior art device and apparatus by providing new and improved apparatus which is of relatively simple, low cost, durable construction, easy to use and simple to operate, adaptable to various size and shape loads, useful without change or modification for various applications, easy to tighten, and not subject to accidental release after tightening while being easy to release when desired.

In general, the apparatus of the present invention comprises a continuous one piece strap means of rectangular cross-section of any desired length made of flexible, high strength, soft finish, weather resistant, tensionable webbing material, such as used for vehicle safety belts, with multiple purpose attachment means fixedly secured to opposite ends of the strap means and operatively associated with winch-type tensioning apparatus of new and improved design in a new and improved manner enabling adjustment of the effective length of the strap means as necessary or desirable.

BRIEF DESCRIPTION OF DRAWING

A presently preferred and illustrative embodiment of the invention is shown in the accompanying drawing in which.

DETAILED DESCRIPTION

Figure 1:
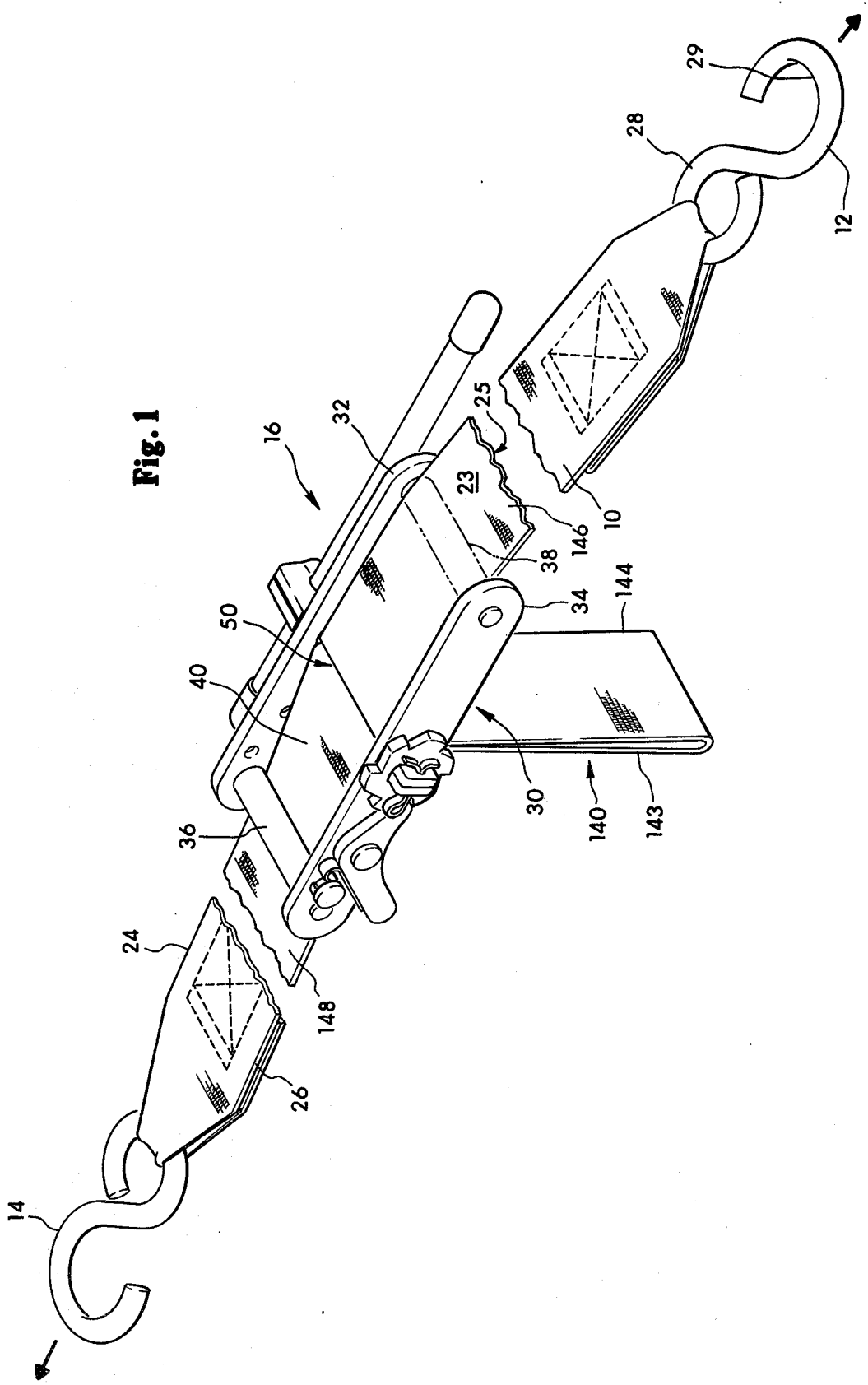
FIG. 1 is a schematic perspective view of a presently preferred and illustrative arrangement of apparatus of the invention.
Figure 2:
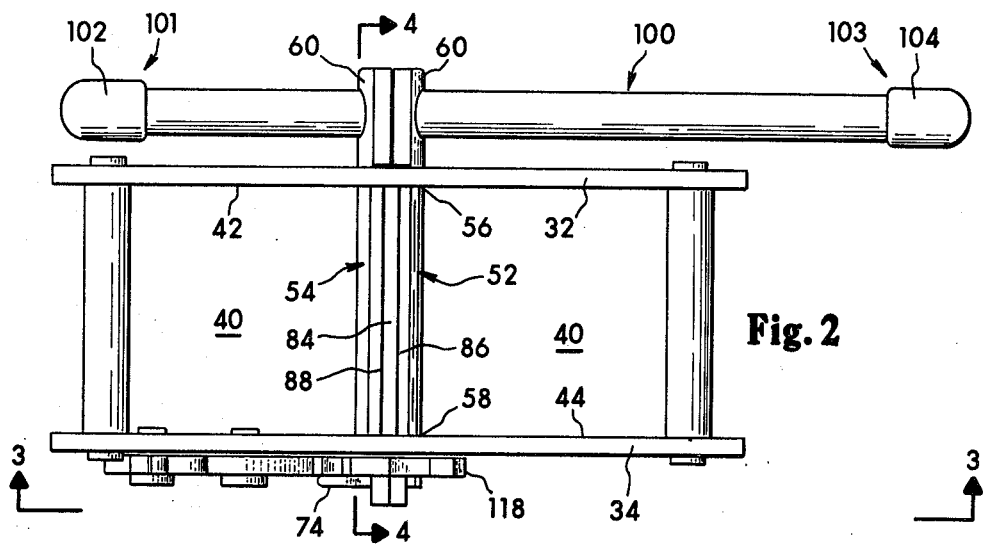
FIG. 2 is a plan view of winch-type tightening apparatus shown in FIG. 1.
Figure 3:
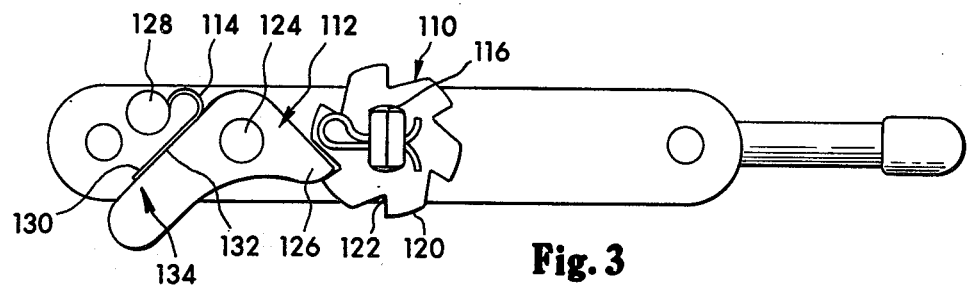
FIG. 3 is a side elevational view of the apparatus of FIG. 2.
Figure 6:
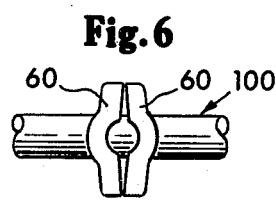
FIG. 6 is an end view of a portion of the apparatus of FIG. 4 taken in the direction of arrow 6.

In general, as shown in FIG. 1, the invention comprises an elongated continuous length strap means 10 for engaging and securing a first object or objects such as, for example, a boat, (no shown) relative to a second object, such as, for example, a boat trailer (not shown). The strap means is provided with attachment means 12, 14, at opposite ends thereof for attaching the opposite ends to, or around, the second object. A winch-type tightening means assembly 16 is operatively associated with the strap means to adjustably tension the strap means between the attachment means and thereby hold the strap means in taut engagement with the first object and secure the first object to the second object.

The strap means 10 is made of one continuous length of conventional flat, flexible, high strength, wear and weather resistant, woven, web-type, material such as Nylon, having a rectangular cross-sectional configuration defined by spaced, parallel, relatively wide (e.g., ½ inch), flat top and bottom surfaces 23, 25, and spaced, parallel relatively narrow-width edge surfaces 24, 26. The woven web type material preferably has a high tensile strength of, for example, 2500 lbs and preferably has a relatively soft outer finish. Attachment means 12, 14 are preferably in the form of conventional S hook members having a closed loop portion 28, permanently secured to a folded over and sewn end portion of the strap, and an open loop portion 29 enabling attachment to various devices in various ways such as to themselves, other S hooks, eyelet type members, spaced support members of objects or to adjacent portions of the strap means.

Referring to FIGS. 1–7, the winch-type tightening means assembly 16 comprises an elongated rigid frame means 30 in the form of a pair of spaced, parallel, elongated plate members 32, 34 fixedly connected at opposite ends by transversely extending connecting rod members 36, 38 to define an elongated cavity 40 between the plate members for receiving and supporting the strap therebetween. The width of the cavity 40, as measured between inner side surfaces 42, 44 of plate members 32, 34, is slightly larger than the width of the strap as measured between strap edge surfaces 24, 26, so that the strap is nestable therewithin while being guidably movable between the inner side surfaces 42, 44. The rod members 36, 38 preferably have a circular cross-sectional configuration to facilitate movement of the strap thereover.

Figure 4:
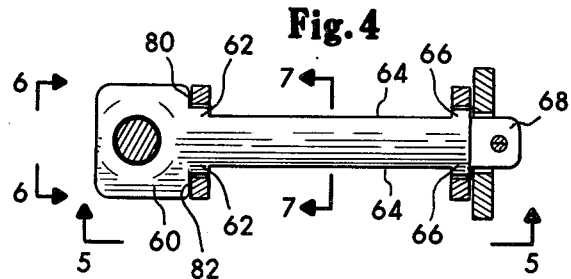
FIG. 4 is a cross-sectional side elevational view, with parts removed, of shaft means associated with the apparatus shown in FIG. 2.
Figure 7:
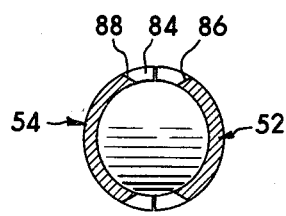
FIG. 7 is a cross-sectional view of a portion of the apparatus of FIG. 4 taken along the line 7—7.
Figure 5:
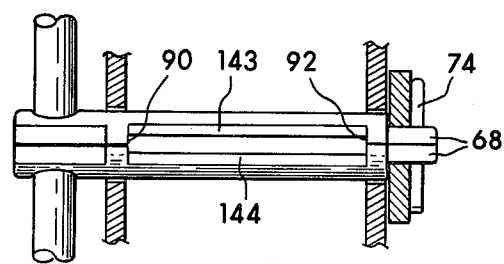
FIG. 5 is a cross-sectional top view, with parts removed, of the apparatus of FIG. 4.

The winch-type means assembly 16 further comprises a rotatable shaft means 50, in the form of a pair of shaft members 52, 54 rotatably supported in aligned circular openings 56, 58 in the plate members 32, 34 and extending transversely therebetween across the cavity 40 midway between rod members 36, 38. Each of the shaft members 52, 54 comprises an enlarged head end portion 60 of generally flat polygonal peripheral configuration, as shown in FIG. 4, a first semi-circular support portion 62 for rotatable supporting engagement with the surface of opening 56, an intermediate slotted portion 64 extending between inner side surfaces 42, 44, a second semi-circular support portion 66 for rotatable supporting engagement with the surface of opening 58, and a reduced end portion 68 of generally flat polygonal peripheral configuration, as shown in FIG. 4. In the assembled position, the flat inner side surfaces of reduced end portions 68 are held in abutting engagement by a cotter pin 74 extending through aligned holes in the reduced end portions and by the surfaces of openings 56, 58 which closely confine the abutting support portions 62, 66. In the assembled position, the shaft members are axially confined by the cotter pin 74 at one end and by oppositely extending abutment surfaces 80, 82 on the head portions. The construction and arrangement of shaft members 52, 54 is such that slotted portions 64 are aligned to define a strap receiving slot means 84 having a width between opposite parallel surfaces 86, 88, which is slightly larger than twice the thickness of the strap means, and having a length between opposite parallel surfaces 90, 92 slightly longer than the width of the strap means and substantially equal to or slightly larger than the width of the cavity 40 between surfaces 42, 44.

A crank handle means, in the form of an enlongated rod member 100, is operatively connected to the shaft means for causing rotation thereof. The rod member 100 may be slidably supported in aligned openings in the head portions 60 of the shaft members and may be slightly flattened (not shown) at both ends 101, 103 to prevent withdrawal of the rod member relative to the head portions 60. In addition, the ends 101, 103 may be provided with enlarged resilient knob members 102, 104 to prevent the rod member from marring other objects during use of the apparatus. The length of rod member 100 is such as to provide sufficient mechanical advantage to properly tension the strap such as, for example, a 9 to 1 mechanical advantage.

Ratchet means, in the form of a ratchet wheel member 110, a ratchet lever 112, and a spring member 114, are provided to releasably hold the shaft means against unwinding rotation during and after tightening of the strap. The ratchet wheel member 110 has a polygonal opening 116 therethrough for receiving the end portions 68 of the shaft members and is held thereon by cotter pin 74 with side surface 118 movably supported by the outer side surface of plate member 34. Suitable ratchet teeth 120 and slots 122 are uniformly provided on the periphery of the ratchet wheel. The ratchet lever 112 is pivotally movably mounted on the outer side surface of plate member 34 by a pin member 124 fixedly secured to the plate member 34 for movement between an engaged position and disengaged position relative to the ratchet wheel. A dog portion 126 of the lever 112 is constructed and arranged to engage the teeth and slots on the periphery of the ratchet wheel and in the engaged position, to prevent strap unwinding rotation of the shaft means while permitting strap winding rotation thereof. The spring member 114 is mounted on a pin member 128 fixedly secured to the plate member 34 with a portion 130 engaging an actuating portion 132 of the lever 112 to bias the lever toward the engaged position while permitting release of the lever during strap winding and movement to the disengaged position by manually applied force on the actuating portion in the direction of arrow 134. Such applied force on the actuating portion disengages dog portion 126 from slots 122 with the movement of the actuating portion being terminated by abutment with pin member 128.

The winch-type tightening means assembly 16 can be made of any suitable rigid material, such, as, for example, steel, which is preferably rust resistant or is provided with a rust resistant coating.

In order to operatively connect the strap means to the winch-type tightening means assembly, an intermediate portion of the strap means is folded over on itself to provide an intermediate loop portion 140 (FIG. 1) formed of two juxtapositioned strap layers 143, 144. The loop portion 140 is then inserted through the slot means 84 of the shaft means 50. The loop portion may be of any desirable length and the length of the loop portion may be adjusted as necessary or desirable by pulling more or less of the loop portion through the slot 84. After the loop portion is located in the slot means 84, rotation of the shaft means 50 in one direction causes the strap means to be wound thereon and rotation of the shaft means in the opposite direction causes unwinding therefrom.

While the strap means and the winch-type tightening means may be separated and separately stored when not in use, more preferably, the length of the cavity 40 between rod members 36, 38 is sufficiently long to enable the strap means to be substantially completely wound onto the shaft means 54 for storage and ease of handling when not in use.

In use of the apparatus, an effective length of the strap means, i.e., those portions of the strap means which do not form part of the intermediate loop portion 140 and extend between the shaft means 50 and the attachment means 12, 14, is adjusted by varying the length of the loop portion until a desired effective length of the strap means is established, the effective length being preferably slightly larger than the length required to engage and hold the particular object to be retained in the tightened position. In forming the effective length, the loop portion may be formed at any desired location along the length of the continuous strap means. Then, with the opposite ends of the strap means suitably connected to or associated with a fixed object and the strap means extending loosely across the object or load to be secured and the shaft member in an unwound position, the loop portion 140 may be pulled through the slot means until substantially the desired effective length of the strap means has been established, and, preferably, a slight amount of tension is established along the effective length of the strap means between the attachment means 12, 14. Among the various possible ways of connecting or associating the opposite ends of the strap means with the fixed or supporting object are attachment of the open ends 29 of the hook members to (1) any fixed device such as a rail, beam, eyelet, rod, etc., (2) to one another with portions of the strap means next adjacent thereto extending around some fixed object such as a rail or beam or bed of a truck etc., and (3) to an adjacent portion of the strap means which has been looped around some fixed object such as a rail or beam, etc. After the approximate effective length of the strap means has been established, only a relatively small length of the strap means need be wound on the shaft means to achieve the desired tensioning of the strap so as to minimize reduction of the relatively high mechanical advantage, provided by the relatively long rod member 100 and the relatively small diameter shaft means. The shaft means is then rotated by appropriate manual manipulation of rod member 100 to wind the loop portion around the shaft means as the strap means is concurrently wound on the loop portion. Preferably, at least a 4 inch length loop portion is initially provided to absorb forces imposed on the taut strap.

The strap means may be arranged relative to the frame means as shown in FIG. 1 wherein one end portion 146, on one side of the loop portion 142 and the shaft means, extends on one side of one rod member 38, and the other end portion 148, on the other side of the loop portion 142 and the shaft means, extends on the opposite side of the other rod member 36. In this manner, as the strap is tensioned by rotation of the shaft means in the direction of the arrow in FIG. 1, counter balancing forces are applied by the strap end portions 146, 148 in opposite directions against the rod members 36, 38 to tend to maintain a substantially straight parallel alignment of the plate members 32, 34 relative to the strap end portions 146, 148. In the arrangement of FIG. 1, the end portion 146 engages the upper surface of rod member 38 and the end portion 148 engages the bottom surface of rod member 36 so as to provide means for exerting counter balancing forces in the opposite direction to the direction of windup rotation of the strap means. Alternatively, the strap means may be arranged so that both end portions 146, 148 extend around the same side of rod members 38, 36, respectively, wherein, for example, the end portion 146 engages the upper surface of rod member 38 and the end portion 148 engages the upper surface of rod member 36.

As the strap is wound on the shaft means, the dog portion 126 of the ratchet lever 112 engages with slots 122 of the ratchet wheel member 110 and is held in engagement by abutting relationship with teeth 120. In this engaged position, the tension on the strap is maintained and may only be increased by rotation of the shaft means as aforedescribed. To release the tension on the strap and to unwind the strap from the shaft means, manually applied force on the actuating portion of the ratchet lever in the direction of arrow 134, FIG. 3, disengages dog portion 126 from slots 122.

While inventive concepts have been disclosed herein in reference to a presently preferred and illustrative embodiment of the invention, it is contemplated that those concepts may be variously employed and embodied in alternate structure. It is intended that the appended claims be construed to cover alternative embodiments of the inventive concepts except insofar as precluded by the prior art.

What is claimed is:

1. Apparatus for fixedly securing one object relative to another object and comprising:
   an elongated continuous length strap means for being attached to the one object and for enagaging and holding the other objects by tension;
   attachment means fixedly non-adjustably connected to opposite ends of said strap means for fixedly securing the opposite ends of said strap means relative to the other object;
   rotatable shaft means for winding and unwinding said strap means to adjustably tension said strap means; and
   winch-type tensioning means operably associated with an intermediate loop portion of said strap for enabling adjustment of the effective length of said strap means and for enabling said effective length of said strap means and said intermediate loop portion of said strap means to be wound and tensioned and unwound and untensioned; said winch-type tensioning means comprising:
   slot means in said shaft means having a sufficient width for adjustably receiving and retaining said intermediate loop portion of said strap means;
   ratchet means operably engageable with said shaft means for releasably holding said shaft means against unwinding rotation during and after tensioning of said strap means; and said rotatable shaft means comprising:
   a pair of split shaft members having mating abuttable support surfaces;
   a groove formed in each of said mating abuttable surfaces; and
   fastening means for holding said abuttable support surfaces of said split shaft members in abutting engagement with the grooves in oppositely spaced axial alignment to form said slot means.

2. The invention as defined in claim 1 and said winch-type tensioning means further comprising:
   an elongated frame means for mounting said shaft means; and
   a strap cavity defined by said frame means for receiving the wound-up portions of said strap means.

3. The invention as defined in claim 2 and wherein said frame means further comprising:
   a pair of elongated spaced parallel side plate members; and
   a pair of spaced parallel connecting rod members extending between said side plate members.

4. The invention as defined in claim 3 and wherein:
   said connecting rod members being of circular cross-section; and
   said strap means being connected to said shaft means with one opposite portion of said strap means extending across and engaging one side of one of said rod members and the other opposite portion of said strap means extending across and engaging the opposite surface of the other of said rod members to exert counter balancing forces thereagainst during winding up and tensioning of said strap means.

5. Apparatus for fixedly securing one object relative to another object and comprising:
   an elongated continuous length strap means for being attached to the one object and for engaging and holding the other objects by tension;
   attachment means fixedly non-adjustably connected to opposite ends of said strap means for fixedly securing the opposite ends of said strap means relative to the other object;
   rotatable shaft means for winding and unwinding said strap means to adjustably tension said strap means;
   slot means in said shaft means having a sufficient width for slidably adjustably receiving and retaining an intermediate loop portion of said strap means for enabling adjustment of the effective length of said strap means by varying the length of said intermediate loop portion and for enabling portions of said effective length of said strap means next adjacent said rotatable shaft means and portions of said intermediate loop portion next adjacent said rotatable shaft means to be simultaneously wound and tensioned and unwound and untensioned by rotation of said rotatable shaft means;
   ratchet means operably engageable with said shaft means for releasably holding said shaft means against unwinding rotation during and after tensioning of said strap means;
   elongated operating handle means operably connected with said rotatable shaft means for causing rotation thereof.
   elongated frame means having a pair of elongated spaced parallel side plate members for mounting said rotatable shaft means;
   said rotatable shaft means comprising a pair of split shaft members rotatably mounted in said side plate members and being spaced from one another to define said slot means and having opposite end portions extending through and rotatably supported in said elongated parallel side plate members;
   said ratchet means having a ratchet wheel member mounted on one juxtapositioned pair of said opposite end portions of said split shaft members and a pawl member mounted on the adjacent one of said side plate members; and said elongated operating handle means comprising an elongated operating handle member slidably mounted on the other juxtapositioned pair of said opposite end portions of said split shaft members adjacent the other of said side plate members.

6. The invention as defined in claim 5 and wherein said attachment means comprising:

S hook members having a closed loop portion and an open loop portion; and said closed loop portion being fixedly attached to the end portion of said strap means.

7. The invention as defined in claim 6 and wherein said strap means being made of flexible, relatively high strength, woven web material.

* * * * *